(12) United States Patent
Winsor et al.

(10) Patent No.: US 10,378,405 B2
(45) Date of Patent: Aug. 13, 2019

(54) METHOD FOR MANAGING TEMPERATURES IN AFTERTREATMENT SYSTEM

(71) Applicant: DEERE & COMPANY, Moline, IL (US)

(72) Inventors: Richard E. Winsor, Waterloo, IA (US); Jacob M. Rosswurm, Raymond, IA (US)

(73) Assignee: DEERE & COMPANY, Moline, IL (US)

( * ) Notice: Subject to any disclaimer, the term of this patent is extended or adjusted under 35 U.S.C. 154(b) by 359 days.

(21) Appl. No.: 15/001,885

(22) Filed: Jan. 20, 2016

(65) Prior Publication Data

US 2017/0204764 A1 Jul. 20, 2017

(51) Int. Cl.

| | |
|---|---|
| *F01N 3/00* | (2006.01) |
| *F01N 3/20* | (2006.01) |
| *F01N 3/035* | (2006.01) |
| *F01N 3/10* | (2006.01) |
| *F02D 41/02* | (2006.01) |
| *F02D 41/14* | (2006.01) |
| *F02D 35/00* | (2006.01) |

(52) U.S. Cl.
CPC ........... *F01N 3/2066* (2013.01); *F01N 3/035* (2013.01); *F01N 3/103* (2013.01); *F02D 35/0092* (2013.01); *F02D 41/024* (2013.01); *F02D 41/1446* (2013.01); *F01N 2560/06* (2013.01); *F01N 2570/14* (2013.01); *F01N 2610/02* (2013.01); *F02D 2200/0802* (2013.01); *F02D 2250/32* (2013.01)

(58) Field of Classification Search
CPC ............. F01N 2560/06; F01N 2570/14; F01N 2610/02; F01N 3/035; F01N 3/103; F01N 3/2066; F02D 2200/0802; F02D 2250/32; F02D 35/0092; F02D 41/024; F02D 41/1446
See application file for complete search history.

(56) References Cited

U.S. PATENT DOCUMENTS

| | | | | |
|---|---|---|---|---|
| 7,197,867 | B2 * | 4/2007 | Huang | .................... F01N 3/023 60/274 |
| 7,594,392 | B2 * | 9/2009 | Wang | .................... F01N 3/0231 60/274 |
| 8,474,247 | B2 * | 7/2013 | Gomez, III | ........... F02D 41/029 60/286 |

(Continued)

FOREIGN PATENT DOCUMENTS

| | | |
|---|---|---|
| EP | 2187008 A1 | 5/2010 |
| EP | 2960455 A1 | 12/2015 |

OTHER PUBLICATIONS

European Search Report in foreign counterpart application No. EP17151881.4 dated May 29, 2017 (7 pages).

*Primary Examiner* — Jesse Bogue

(57) ABSTRACT

A method for managing temperatures in an aftertreatment system positioned downstream of an engine. The method includes (1) combusting a rich air/diesel mixture in a cylinder of the engine, and then (2) combusting a lean air/diesel mixture in the cylinder, in the next combustion event in the cylinder, after combusting the rich air/diesel mixture therein. The method further includes repeating steps (1) and (2) in the cylinder and basing a frequency thereof on a desired aftertreatment system temperature.

12 Claims, 2 Drawing Sheets

(56) References Cited

U.S. PATENT DOCUMENTS

| | | | |
|---|---|---|---|
| 8,534,050 B2 * | 9/2013 | Yanakiev | F01N 13/009 60/284 |
| 2003/0079466 A1 | 5/2003 | Surnilla | |
| 2004/0187483 A1 * | 9/2004 | Dalla Betta | F01N 3/0814 60/286 |
| 2008/0104945 A1 * | 5/2008 | Ruth | F01N 3/0231 60/286 |
| 2014/0230416 A1 * | 8/2014 | Nobukawa | F01N 3/103 60/286 |
| 2015/0275723 A1 * | 10/2015 | Koch | F02D 13/0249 60/605.2 |
| 2015/0308363 A1 | 10/2015 | Choi | |

* cited by examiner

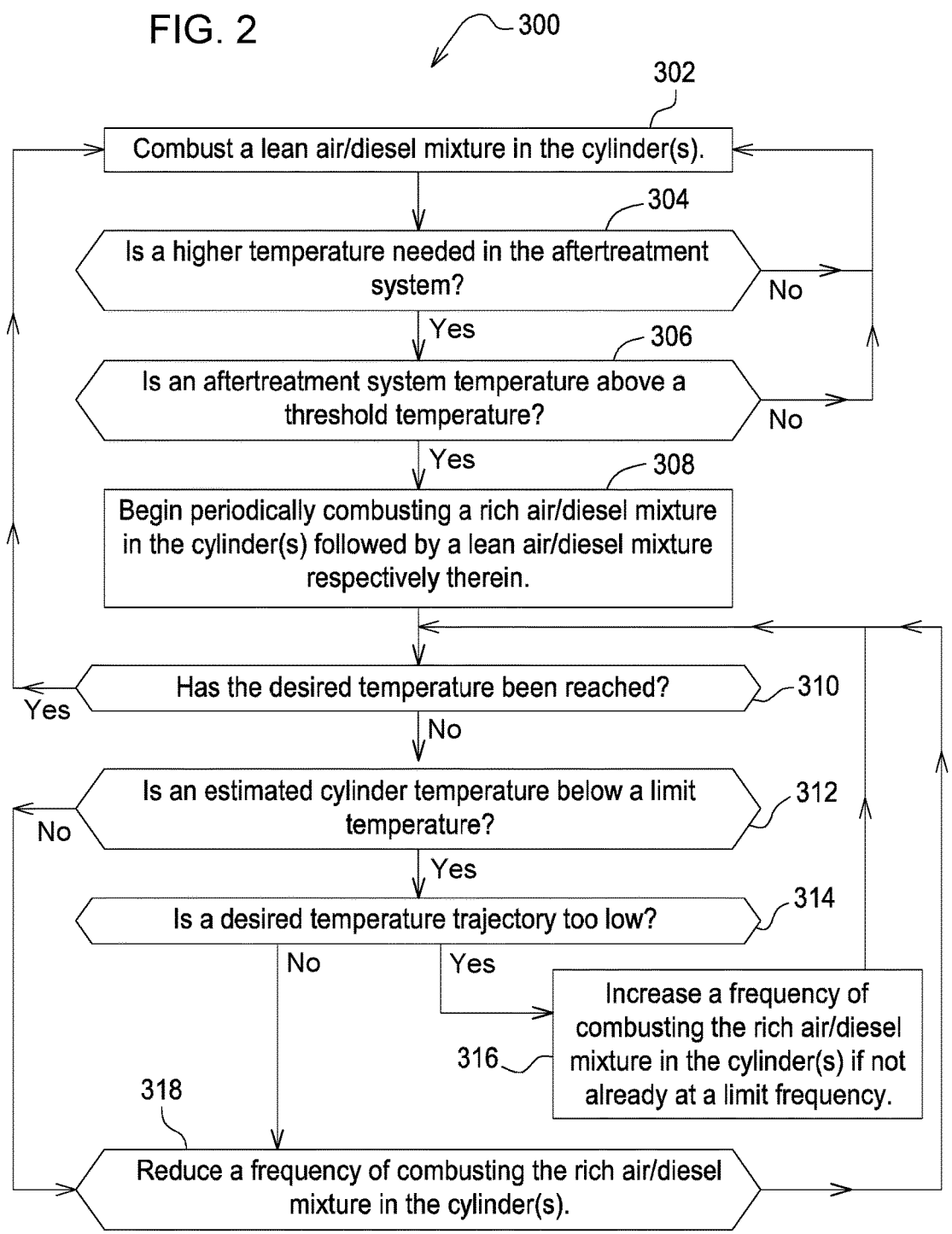

METHOD FOR MANAGING TEMPERATURES IN AFTERTREATMENT SYSTEM

FIELD OF THE DISCLOSURE

The present disclosure relates to a method for managing exhaust temperatures in an aftertreatment system of an engine.

BACKGROUND OF THE DISCLOSURE

Diesel engines generate nitrogen oxides emissions, which include nitrogen oxide ("NO") and nitrogen dioxide ("$NO_2$")", known collectively as "$NO_x$." To comply with stringent government mandates regarding $NO_x$ emissions, engine manufacturers have developed several $NO_x$ reduction approaches. One such approach is exhaust gas recirculation ("EGR"), in which a percentage of the exhaust gas is drawn or forced back into the intake and mixed with the fresh intake gas and fuel that enters the combustion chamber. Another approach is selective catalytic reduction ("SCR"). The SCR process reduces $NO_x$ to diatomic nitrogen ("$N_2$") and water ("$H_2O$"), using a catalyst and anhydrous ammonia ("$NH_3$") or aqueous $NH_3$, or a precursor that is convertible to $NH_3$, such as urea.

In addition to $NO_x$ emissions, diesel engines also produce particulate matter ("PM"), or soot. PM is a complex emission that includes elemental carbon, heavy hydrocarbons derived from the fuel, lubricating oil, and hydrated sulfuric acid derived from the fuel sulfur. One approach for reducing or removing PM in diesel exhaust is a diesel particle filter ("DPF"). The DPF is designed to collect PM, while simultaneously allowing exhaust gases to pass therethrough.

A diesel oxidation catalyst ("DOC") may be positioned upstream of the DPF. Among other things, the DOC oxidizes hydrocarbons ("HC") and converts NO to $NO_2$. Organic constituents that are trapped in the DPF, such as carbon, are oxidized therein, using the $NO_2$ generated by the DOC, so as to form $CO_2$ and $H_2O$, both of which exit into the atmosphere.

Proper operation of the DOC, DPF, and SCR catalyst, which are core components of what is referred to as an aftertreatment system, require operating conditions that are within important temperature parameters.

For example, one temperature parameter is the DOC's "light off" temperature. When below the light off temperature, the DOC's energy level is too low to oxidize HC. The light off temperature is typically around 200-250° C.

Another temperature parameter is related to the conversion of NO to $NO_2$. This NO conversion temperature spans a range of temperatures having both lower and upper bounds, which are defined as the minimum and maximum temperatures at which 40% or greater NO conversion is achieved. The conversion temperature range defined by those two bounds and extends from approximately 200-250° C. to approximately 450° C.

Yet another temperature parameter is related to DPF regeneration. Regeneration involves the presence of conditions that will burn off trapped particulates whose unchecked accumulation would damage the DPF. There are two main forms of regeneration: passive and active.

Passive regeneration is a regeneration that can occur anytime that the engine is operating under conditions that burn off PM without initiating a specific regeneration strategy embodied by algorithms in an electronic control system. Passive regeneration occurs when the DOC inlet temperature is greater than 200-250° C., and conversion becomes greater at higher temperatures with more $NO_2$.

In contrast, active regeneration is a regeneration that is initiated and maintained intentionally by, for example, an electronic control system. The active regeneration raises the temperature of the exhaust gases entering the DPF to a range suitable for initiating and maintaining burning of trapped particulates. The creation of conditions for initiating and continuing active regeneration involves elevating the temperature of exhaust gas entering the DPF to a suitably high temperature.

And still another temperature parameter is related to sulfur removal processes. The presence of sulfur decreases the efficiency of various components in the exhaust aftertreatment system, including the SCR catalyst. Presently known sulfur removal processes require exposing the SCR catalyst to very high temperatures.

There are significant challenges associated with working within these various temperature parameters, particularly when the engine is initially started or operating at low to medium loads. In some aftertreatment systems and during some operating conditions, HC is injected into the exhaust stream, sometimes via a fuel dosing injector positioned upstream of the DOC, or via in-cylinder dosing. While these injections can be useful for raising temperatures in the aftertreatment system, they cannot be used at lower temperatures, as a result of HC having a relatively high oxidation temperature (e.g., 200-250° C.) before it can generate heat via an exothermic reaction in the DOC.

SUMMARY OF THE DISCLOSURE

Disclosed is a method for managing temperatures in an aftertreatment system positioned downstream of an engine. The method includes (1) combusting a rich air/diesel mixture in a cylinder of the engine, and then (2) combusting a lean air/diesel mixture in the cylinder, in the next combustion event in the cylinder, after combusting the rich mixture therein. The method further includes repeating steps (1) and (2) in the cylinder and basing a frequency thereof on a desired aftertreatment system temperature.

This method provides a technical effect of combusting a rich mixture and outputting exhaust gases with increased levels of combustible materials, such as CO and hydrogen. The CO has a low oxidation temperature of approximately 150° C.—in contrast to 200-250° C. for HC—and is capable of generating exothermic reactions in the DOC much sooner than an HC injection. These exothermic reactions raise temperatures in the aftertreatment system, so it may operate within the temperature parameters discussed above, in some cases even a short time after the engine is initially started and/or when operating at low to medium loads.

By repeating steps (1) and (2), the cylinder provides relatively constant power levels, and does not get too hot. And also by repeating these steps—instead of continuously combusting rich mixtures—the exhaust gas has enough oxygen for the CO to be oxidized to $CO_2$, and raise the temperature levels in the aftertreatment system, as a result of this highly exothermic reaction.

BRIEF DESCRIPTION OF THE DRAWINGS

The detailed description of the drawings refers to the accompanying figures in which:

FIG. 2 is a flow chart of an example method for managing temperatures in an aftertreatment system of the engine.

DETAILED DESCRIPTION OF THE DRAWINGS

Figure 1:
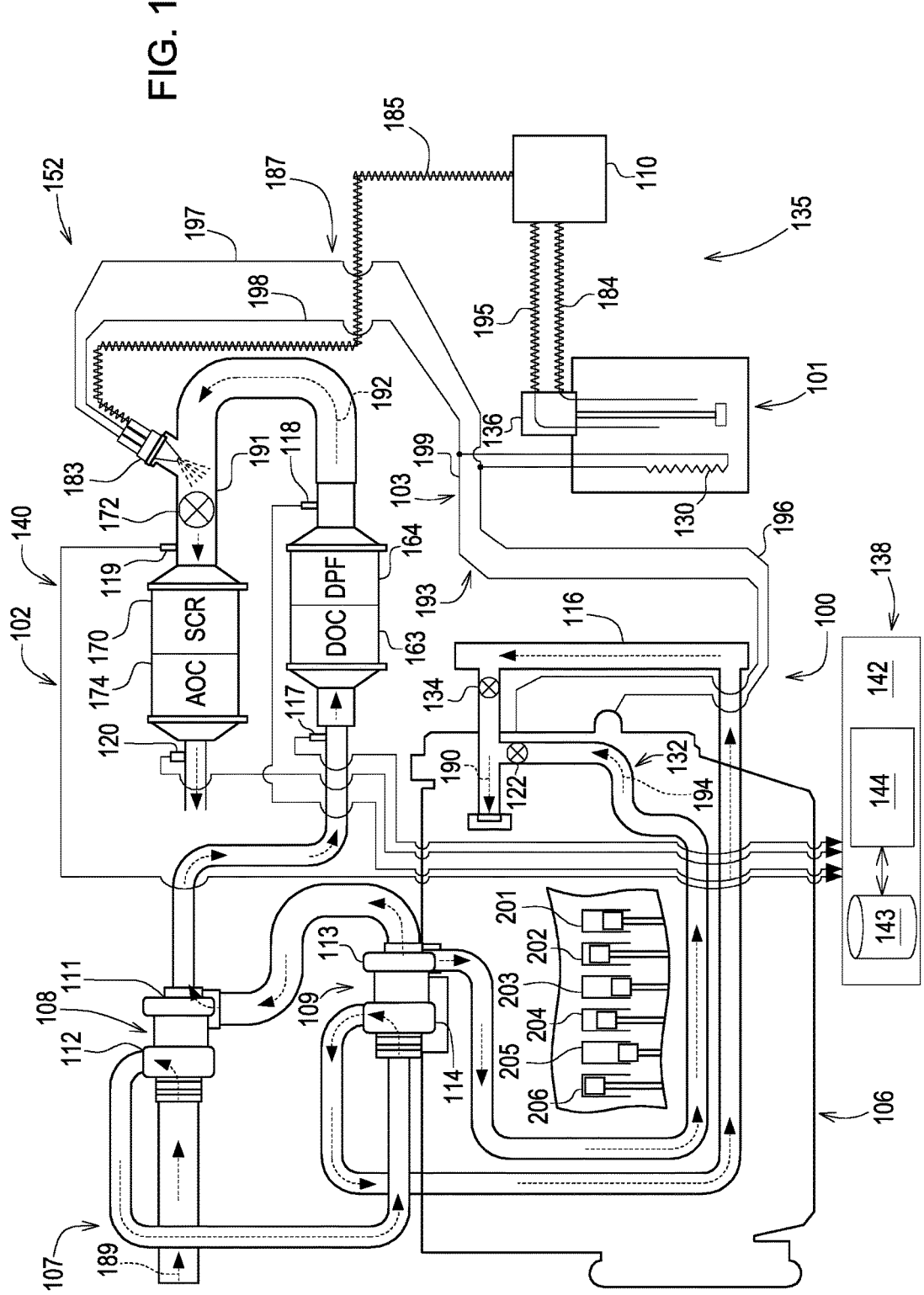
FIG. 1 is a simplified schematic illustration of an example power system, the power system includes an example of an engine, part of which is shown in cutaway so as to illustrate the cylinders therein.

Referring to FIG. 1, there is shown a schematic illustration of a power system 100 for providing power to a variety of machines, including on-highway trucks, construction vehicles, marine vessels, stationary generators, automobiles, agricultural vehicles, and recreational vehicles. The engine 106 may be any kind that produces an exhaust gas, as indicated by directional arrow 192. For example, engine 106 may be an internal combustion engine, such as a gasoline engine, a diesel engine, a gaseous fuel burning engine (e.g., natural gas), or any other exhaust gas producing engine. The illustrated example of the engine 106 is shown as having six inline cylinders with a first cylinder 201, a second cylinder 202, a third cylinder 203, a fourth cylinder 204, a fifth cylinder 205, and a sixth cylinder 206. Other examples of the engine 106 may have other kinds of configurations (e.g., "V," inline, and radial), and may have any number of cylinders.

The power system 100 may include an intake system 107 that includes components for introducing a fresh intake gas, as indicated by directional arrow 189, into the engine 106. Among other things, the intake system 107 may include an intake manifold, a compressor 112, a charge air cooler 116, and an air throttle actuator 134.

The compressor 112 may be a fixed geometry compressor, a variable geometry compressor, or any other type of compressor that is capable of receiving the fresh intake gas from upstream of the compressor 112. The compressor 112 compresses the fresh intake gas to an elevated pressure level. As shown, the charge air cooler 116 is positioned downstream of the compressor 112, and cools the fresh intake gas.

Further, the power system 100 includes an exhaust system 140, which has components for directing exhaust gas from the engine 106 to the atmosphere. The pressure and volume of the exhaust gas drives the turbine 111, allowing it to drive the compressor 112 via a shaft. The combination of the compressor 112, the shaft, and the turbine 111 is known as a turbocharger 108.

Some embodiments of the power system 100 may also include a second turbocharger 109 that cooperates with the turbocharger 108 (i.e., series turbocharging). The second turbocharger 109 includes a second compressor 114, a second shaft, and a second turbine 113. The second compressor 114 may be a fixed geometry compressor, a variable geometry compressor, or any other type of compressor capable of receiving fresh intake gas, from upstream of the second compressor 114, and compressing the fresh intake gas to an elevated pressure level before it enters the engine 106.

The power system 100 may also have an EGR system 132 for receiving a recirculated portion of the exhaust gas, as indicated by directional arrow 194. The intake gas is indicated by directional arrow 190, and it is a combination of the fresh intake gas and the recirculated portion of the exhaust gas. The EGR system 132 may have an EGR valve 122 and an EGR mixer. The EGR valve 122 may allow a specific amount of the recirculated portion of the exhaust gas back into the intake manifold.

As further shown, the exhaust system 140 may include an aftertreatment system 102, and at least a portion of the exhaust gas passes therethrough. The aftertreatment system 102 removes various chemical compounds and particulate emissions present in the exhaust gas received from the engine 106.

The aftertreatment system 102 is shown having a DOC 163, a DPF 164, and an SCR system 152, though the need for such components depends on the particular size and application of the power system 100. The SCR system 152 has a reductant delivery system 135, an SCR catalyst 170, and an ammonia oxidation catalyst ("AOC") 174. The exhaust gas may flow through the DOC 163, the DPF 164, the SCR catalyst 170, and the AOC 174, and is then, as just mentioned, be expelled into the atmosphere. Exhaust gas that is treated in the aftertreatment system 102 and released into the atmosphere contains significantly fewer pollutants—such as PM, $NO_x$, and hydrocarbons—than an untreated exhaust gas.

The DOC 163 may be configured in a variety of ways and contain catalyst materials useful in collecting, absorbing, and/or converting hydrocarbons, carbon monoxide, and/or oxides of nitrogen contained in the exhaust gas. Among other things, the DOC 163 typically oxidizes NO contained in the exhaust gas, and converts it to $NO_2$.

The DPF 164 may be any of various particulate filters known in the art that are capable of reducing PM concentrations (e.g., soot and ash) in the exhaust gas, so as to meet requisite emission standards. If the DPF 164 were used alone, it would initially help in meeting the emission requirements, but would quickly fill up with soot and need to be replaced. Therefore, the DPF 164 is combined with the DOC 163, which helps extend the life of the DPF 164 through the process of regeneration.

The ECU 142 may measure the PM build up, also known as filter loading, in the DPF 164, using a combination of algorithms and sensors. When filter loading occurs, the ECU 142 manages the initiation and duration of the regeneration process.

The reductant delivery system 135 may include a reductant tank 101 for storing the reductant for the SCR system 152. One example of a reductant is a solution having 32.5% high purity urea and 67.5% deionized water (e.g., DEF), which decomposes as it travels through a decomposition tube 191 to produce $NH_3$.

The reductant delivery system 135 may include a reductant header 136 mounted to the reductant tank 101. The power system 100 may include a cooling system 103 having a reductant coolant supply passage 187 and a reductant coolant return passage 193. The cooling system 103 may be an opened system or a closed system, depending on the specific application, while the coolant may be any form of engine coolant, including fresh water, sea water, an antifreeze mixture, and the like.

A first segment 196 of the reductant coolant supply passage 187 is positioned fluidly, between the engine 106 and the tank heating element 130, for supplying coolant to the tank heating element 130. A second segment 197 of the reductant coolant supply passage 187 is positioned fluidly between the tank heating element 130 and a reductant delivery mechanism 183 for supplying coolant thereto.

The decomposition tube 191 may be positioned downstream of the reductant delivery mechanism 183 but upstream of the SCR catalyst 170. As shown, the SCR system 152 may include a reductant mixer 172 that is positioned upstream of the SCR catalyst 170 and downstream of the reductant delivery mechanism 183.

The reductant delivery system 135 may additionally include a reductant pressure source and a reductant extraction passage 184. The reductant delivery system 135 may further include a reductant supply module 110. The reductant delivery system 135 may also include a reductant dosing passage 185 and a reductant return passage 195.

The AOC 174 may be any of various flowthrough catalysts for reacting with $NH_3$ and thereby produce nitrogen. As shown, the AOC 174 and the SCR catalyst 170 may be positioned within the same housing, but in other embodiments, they may be separate from one another.

An electronic control system 138 of the engine 106 may include an electronic control unit ("ECU") 142 for monitoring and controlling the operation of the engine 106. As shown in FIG. 1, the ECU 142 may include a processor 144 and a memory 143 in communication therewith. The processor 144 may be implemented using, for example, a microprocessor or other suitable processor. The memory 143 may be implemented using any suitable computer-readable media, and may include RAM and/or ROM. The memory 143 may store software, such as algorithms and/or data, for configuring the processor 144 to perform one or more functions of the ECU 142. Alternatively, the ECU 142 may include discrete electronic circuits configured to perform such functions.

The electronic control system 138 may also include one or more temperature sensors for sensing temperatures of the aftertreatment system 102. For example, the electronic control system 138 may include a first temperature sensor 117, a second temperature sensor 118, a third temperature sensor 119, and a fourth temperature sensor 120. The first temperature sensor 117 may be upstream of the DOC 163. The second temperature sensor 118 may be downstream of the DPF 164, but upstream of the SCR catalyst 170. The third temperature sensor 119 may be downstream of the second temperature sensor 118, but upstream of the SCR catalyst 170. And the fourth temperature sensor 120 may be downstream of the AOC 174. These are just four of the many possible locations for the temperature sensors 117-120 in the aftertreatment system 102.

Referring to FIG. 2, there is shown an example of a method 300 for managing energy levels (i.e., temperatures) in the aftertreatment system 102. At step 302, the method 300 may include combusting a lean air/diesel mixture in a cylinder of the engine 106 (i.e., any of the cylinders 201-206). Upon the opening of the exhaust valve associated with the respective cylinder, excess air ($N_2$ and $O_2$) and combustion products are exhausted. As a result of the excess $O_2$, combusted lean mixtures are oxidizing in nature.

At step 304, the method 300 may include determining whether a higher temperature is needed somewhere in the aftertreatment system 102. The higher temperature may be needed at the DPF 164 for regeneration purposes, at the SCR catalyst 170 for sulfur removal purposes, or at the SCR catalyst 170 for improving conversion efficiencies, just to name a few examples. If a higher temperature is needed, then the method 300 may proceed to step 306. Otherwise, it may proceed back to step 302 and continue combusting a lean mixture in the cylinder.

At step 306, the method 300 may include determining whether the aftertreatment temperature is above a threshold temperature. Exemplarily, the aftertreatment temperature may be a temperature of the DOC 163. And also exemplarily, the threshold temperature may be a temperature that the DOC 163 can begin oxidizing the CO, which may be approximately 150° C. and even down to 70° C. or lower in a DOC 163 that is optimized for such reactions. In such an example, if the DOC temperature is above the threshold temperature, then the method 300 may proceed to step 308. In contrast, if the temperature is below the threshold, it may repeat step 302 and combust a lean mixture, instead of a rich air/diesel mixture. Below the threshold temperature, the rich mixture would result in high CO levels, but the DOC 163 would not be warm enough to oxidize the CO to $CO_2$ and, thus, would not raise temperatures in the aftertreatment system 102 based on this exothermic reaction. Further, as compared to the rich mixture, the lean mixture provides consistent power levels, lower combustion temperatures, and lower PM levels.

At step 308, the method 300 may begin periodically (1) combusting a rich mixture in the cylinder based on the aftertreatment temperature being above the threshold temperature, and then (2) combusting an additional lean mixture in the cylinder in a next combustion event therein. In some embodiments of step 308, the method 300 may always combust an additional lean mixture in the cylinder in the next combustion event therein. The combusting of the rich mixture may include injecting diesel fuel into the cylinder between 15° before a piston positioned therein is at top dead center, and 20° after the piston is at top dead center. In some embodiments, the combusting of the rich mixture may include injecting between 5° before top dead center, and 10° after top dead center. Injecting in this range may lower the chance that the cylinder will become over pressurized or overheated.

Step 308 provides a technical effect of combusting a rich mixture and outputting exhaust gases with increased levels of combustible materials, such as CO and hydrogen. The CO has a low oxidation temperature of approximately 150° C. or lower, in contrast to 200-250° C. for HC, and is capable of generating exothermic reactions in the DOC 163 at lower temperatures than an HC injection (and in less time after a cold start, for example). These exothermic reactions raise temperatures in the aftertreatment system 102, so it may operate within its temperature parameters, in some cases even a short time after the engine 106 is initially started and/or when operating at low to medium loads.

By repeating (1) and (2) of step 308—instead of continuously combusting rich mixtures—the cylinder provides relatively constant power levels, and cylinder temperatures do not get too high. And also by repeating these steps—instead of continuously combusting rich mixtures—the exhaust gas has enough oxygen for the CO to exothermically react with (and become $CO_2$), and thus raise the temperature levels in the aftertreatment system 102. Or stated slightly differently, continuously combusting a rich mixture will result in there being too little, if any, oxygen in the exhaust gas to exothermically combine with CO, so as to form $CO_2$.

Some embodiments of the method 300 may include repeating step 308, but in different cylinders of the engine 106. At step 308, the method 300 may include combusting an additional lean mixture in a next cylinder immediately and sequentially after combusting the rich mixture in the cylinder. The next cylinder is in a firing order that is immediately and sequentially after the cylinder. In some embodiments of step 308, the method 300 may always (i.e., 100% of the time), or substantially always (i.e., 70-99.9% of the time), include combusting a lean mixture immediately following each combusting of a rich mixture. By repeating (1) and (2) of step 308 in different cylinders—instead of periodically in just one cylinder—there is a lower chance that a given cylinder will become over pressurized or overheated.

The combusting of the rich mixture may occur in between 2% and 45% of the combustion events during operating conditions that require higher energy levels in the aftertreatment system 102. Combusting the rich mixture in even just 2% of the combustion events provides useful energy for raising temperatures in the aftertreatment system 102. And limiting it to 45% of the combustion events (1) ensures that adequate oxygen is available in the exhaust gas, so as to oxidize CO in the exhaust gas to $CO_2$, and (2) prevents the cylinders 201-206 from overheating.

The rich mixture may be combusted in different cylinders of the engine 106 in various ways. But as just one example, in the illustrated engine 106, the rich mixture may be combusted as follows: 153624153624153624153624, 153624153624153624153624. The number 1 represents a combustion event in the first cylinder 201, the number 2 represents a combustion event in second cylinder 202, and so on. The bold numbers represent the combustion of a rich mixture, and the non-bold numbers represent the combustion of a lean mixture. In this example, there are 10 rich combustion events out of 24 total, meaning that 42% of the combustion events combust a rich mixture.

As another example, in a four cylinder engine, the rich mixture may be combusted as follows: 13421342134213421342134213421342134213421342. In this example, there are 8 rich combustion events out of 20 total, meaning that 40% of the combustion events combust a rich mixture.

At step 310, the method 300 may include determining whether the desired aftertreatment temperature has been reached. If it has, then the method 300 may repeat step 302 and, in some cases, continuously combust a lean mixture. Consistently combusting a lean mixture provides consistent power levels, manageable cylinder temperatures, and manageable PM emissions levels. However, if the desired aftertreatment temperature has not been reached, then it may proceed to step 312.

At step 312, the method 300 may include determining whether an estimated cylinder temperature is below a limit temperature. If the estimated cylinder temperature is below the limit temperature, then the method 300 may proceed to step 314. But if the estimated cylinder temperature is above the limit temperature, then it may proceed to step 318. This prevents the cylinders 201-206 and engine 106 from getting too hot and being damaged.

At step 314, the method 300 may include determining whether a desired aftertreatment temperature trajectory is too low. If the desired aftertreatment temperature trajectory is too low, then to raise it, the method 300 may proceed to step 316. Otherwise, if the trajectory is too high, then to lower it, the method 300 may proceed to step 318.

At step 316, the method 300 may increase a frequency of combusting the rich mixture in the cylinder(s) followed by the lean mixture respectively therein. After increasing the frequency, the method 300 may proceed back to step 310. Increasing the frequency of combusting the rich mixture may be limited by a limit frequency. The limit frequency may be based on the amount of oxygen in the exhaust gas, or more specifically on ensuring that there is enough oxygen to oxidize the CO in the exhaust gas to $CO_2$ effectively.

At step 318, the method 300 may include decreasing a frequency of combusting the rich mixture in the cylinder(s) followed by the lean mixture respectively therein. After decreasing the frequency, then the method 300 may proceed to step 310.

At step 310, if the desired temperature has been reached, then the method 300 may proceed back to step 302 and combust only lean mixtures in the cylinder.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A method for managing energy in an aftertreatment system positioned downstream of an engine, the aftertreatment system comprising a diesel oxidation catalyst, the method comprising:
   (a) combusting a lean air/diesel mixture in a cylinder of the engine;
   (b) determining whether an aftertreatment system temperature is above a threshold temperature;
   (c) combusting a rich air/diesel mixture in the cylinder following the determination that the aftertreatment system temperature is above the threshold temperature;
   (d) repeating transitions back-and-forth between (a) and (c) and basing a frequency of (c) on a cylinder temperature relative to a cylinder limit temperature; and
   (e) substantially always combusting an additional lean air/diesel mixture in the cylinder, in a next combustion event in the cylinder, after combusting the rich air/diesel mixture therein.

2. The method of claim 1, wherein the aftertreatment system temperature is a diesel oxidation catalyst temperature.

3. The method of claim 1, wherein the combusting of the rich air/diesel mixture comprises injecting diesel fuel into the cylinder between 5° before a piston positioned therein is at top dead center and 10° after the piston is at top dead center.

4. The method of claim 1, further comprising combusting a lean air/diesel mixture in a next cylinder immediately and sequentially after combusting the rich air/diesel mixture in the cylinder, the next cylinder being in a firing order that is immediately and sequentially after the cylinder.

5. The method of claim 1, further comprising substantially-always combusting a lean air/diesel mixture in a next cylinder sequentially after combusting the rich air/diesel mixture in the cylinder, the next cylinder being in a firing order that is sequentially after the cylinder.

6. The method of claim 1, further comprising:
   determining a desired aftertreatment system temperature; and
   basing the frequency of (c) on the desired aftertreatment system temperature relative to a current aftertreatment system temperature.

7. The method of claim 1, wherein when the aftertreatment system temperature is above a threshold aftertreatment temperature but below a desired aftertreatment temperature, the combusting of the rich air/diesel mixture occurs in between 2% and 45% of the combustion events in the cylinder.

8. A method for managing energy in an aftertreatment system positioned downstream of an engine, the method comprising:
   (a) combusting a rich air/diesel mixture in a cylinder of the engine;

(b) combusting a lean air/diesel mixture in the cylinder, in a next combustion event in the cylinder, after combusting the rich air/diesel mixture therein;

(c) repeating transitions back-and-forth between (a) and (b) in the cylinder and basing a frequency of (a) on a desired aftertreatment system temperature rate increase; and (d) substantially always combusting a lean air/diesel mixture in a next cylinder immediately and sequentially after combusting the rich air/diesel mixture in the cylinder, the next cylinder being in a firing order that is immediately and sequentially after the cylinder.

9. The method of claim 8, wherein the aftertreatment system comprises a diesel oxidation catalyst ("DOC"), and the method further comprises:

determining whether a DOC temperature is above a threshold DOC temperature; and combusting the rich air/diesel mixture in the cylinder only when the DOC temperature is above the threshold DOC temperature.

10. The method of claim 8, wherein the combusting of the rich air/diesel mixture comprises injecting diesel fuel into the cylinder between 5° before a piston positioned therein is at top dead center and 10° after the piston is at top dead center.

11. The method of claim 8, wherein when the aftertreatment system temperature is above a threshold aftertreatment temperature but below a desired aftertreatment temperature, the combusting of the rich air/diesel mixture occurs in between 2% and 45% of the combustion events in the cylinder.

12. A method for managing energy in an aftertreatment system positioned downstream of an engine, the aftertreatment system comprising a diesel oxidation catalyst, the method comprising:

(a) combusting a lean air/diesel mixture in a cylinder of the engine;

(b) combusting a rich air/diesel mixture in the cylinder; and (c) repeating transitions back-and-forth between (a) and (b), and when an aftertreatment system temperature is above a threshold aftertreatment temperature but below a desired aftertreatment temperature, (a) occurs in between 2% and 45% of the combustion events in the cylinder.

* * * * *